United States Patent
Corrigan

(10) Patent No.: US 11,686,261 B2
(45) Date of Patent: Jun. 27, 2023

(54) PROCESS AND AN APPARATUS TO ADJUST THE IGNITION TIMING OF AN INTERNAL COMBUSTION ENGINE

(71) Applicant: FERRARI S.p.A., Modena (IT)

(72) Inventor: Daire James Corrigan, Modena (IT)

(73) Assignee: FERRARI S.p.A., Modena (IT)

( * ) Notice: Subject to any disclaimer, the term of this patent is extended or adjusted under 35 U.S.C. 154(b) by 0 days.

(21) Appl. No.: 17/704,380

(22) Filed: Mar. 25, 2022

(65) Prior Publication Data
US 2022/0307432 A1 Sep. 29, 2022

(30) Foreign Application Priority Data

Mar. 29, 2021 (IT) .................. 102021000007604

(51) Int. Cl.
| | |
|---|---|
| *F02P 5/153* | (2006.01) |
| *F02D 35/02* | (2006.01) |
| *F02D 13/02* | (2006.01) |
| *F02D 41/00* | (2006.01) |
| *F02D 41/30* | (2006.01) |
| *F02D 41/40* | (2006.01) |
| *F02P 5/152* | (2006.01) |

(52) U.S. Cl.
CPC ....... *F02D 35/026* (2013.01); *F02D 13/0215* (2013.01); *F02D 35/023* (2013.01); *F02D 35/027* (2013.01); *F02D 41/0047* (2013.01); *F02D 41/3029* (2013.01); *F02D 41/401* (2013.01); *F02D 41/402* (2013.01); *F02P 5/153* (2013.01); *F02P 5/1521* (2013.01)

(58) Field of Classification Search
CPC ....... F02D 35/023; F02D 35/026; F02P 5/153
USPC ......................... 123/406.41, 406.55
See application file for complete search history.

(56) References Cited

U.S. PATENT DOCUMENTS

| | | | |
|---|---|---|---|
| 5,909,723 A | 6/1999 | Ichimoto et al. | |
| 2004/0144082 A1* | 7/2004 | Mianzo | F02D 41/0052 60/285 |
| 2015/0330326 A1* | 11/2015 | Shaver | F02D 41/3035 123/445 |

(Continued)

FOREIGN PATENT DOCUMENTS

WO 2018198567 A1 11/2018

OTHER PUBLICATIONS

International Search Report for Application No. 102021000007604 dated Dec. 8, 2021.

*Primary Examiner* — Erick R Solis
(74) *Attorney, Agent, or Firm* — Cantor Colburn LLP

(57) ABSTRACT

A process to adjust the ignition timing of an air-fuel mixture in a combustion chamber of an internal combustion engine, the process comprises determining a first quantity indicative of a pressure of the mixture for a cycle of the engine, determining a second quantity indicative of a speed of the engine, determining a third quantity indicative of a first temperature of a conditioning fluid, providing a heat exchange mathematical model for the combustion chamber, which maps the three quantities from the first to the third one onto a fourth quantity indicative of a second temperature of a wall portion around the combustion chamber, estimating the fourth quantity by means of the three determined quantities and by means of the mathematical model, and adjusting the ignition timing as a function of the fourth estimated quantity.

15 Claims, 2 Drawing Sheets

(56) References Cited

U.S. PATENT DOCUMENTS

| | | |
|---|---|---|
| 2016/0194007 A1* | 7/2016 | Furuya .............. B60W 50/0097 |
| | | 477/166 |
| 2016/0215718 A1 | 7/2016 | Willcox et al. |
| 2018/0045126 A1* | 2/2018 | He ........................ F02D 35/026 |
| 2019/0285008 A1 | 9/2019 | Yoneya et al. |
| 2020/0277908 A1* | 9/2020 | Glugla ................ F16H 61/0213 |
| 2020/0332759 A1* | 10/2020 | Oryoji ................... F02P 5/1523 |
| 2021/0239068 A1* | 8/2021 | Matsumoto ........... F02D 41/401 |

* cited by examiner

PROCESS AND AN APPARATUS TO ADJUST THE IGNITION TIMING OF AN INTERNAL COMBUSTION ENGINE

CROSS-REFERENCE TO RELATED APPLICATIONS

This patent application claims priority from Italian patent application no. 102021000007604 filed on Mar. 29, 2021, the entire disclosure of which is incorporated herein by reference.

TECHNICAL FIELD

The invention relates to a process and an apparatus to adjust the ignition timing of an air-fuel mixture in a combustion chamber of an internal combustion engine, in particular a spark-ignition internal combustion engine.

PRIOR ART

In an internal combustion engine, the ignition of the air-fuel mixture normally takes place in advance relative to the moment in which the piston reaches the top dead centre in the combustion chamber.

As a matter of fact, for example, an ignition at the top dead centre would cause a reduction in the pressure peak inside the combustion chamber, with a consequent decrease in the obtainable work and, hence, in the efficiency of the engine cycle.

Furthermore, a spark advance also leads to an increase in the brake torque of the engine.

If the pressure peak basically increases in a linear manner with the advance, the brake torque has a non-linear behaviour, so has to have a theoretical maximum point.

Once the theoretical maximum point is reached, a further advance would be disadvantageous, since the piston would face a greater and greater resistance offered by the mixture being burnt.

Therefore, a convenient setting of the moment in which the spark is released relative to the position of the piston, also known as ignition timing, could theoretically be such as to allow the maximum brake torque to be obtained.

This ignition timing is commonly known as maximum brake torque or MBT timing.

However, the setting of the maximum brake torque timing is not always convenient, for example when the engine runs slow or also at a high rpm, due to the possible occurrence of knock phenomena.

Knocking is a known phenomenon arising in spark-ignition engines, which causes high-frequency pressure oscillations and abnormal thermal phenomena.

The temperature of the engine is a significant factor affecting knock phenomena. Indeed, knocking is positively correlated with increases in the temperature of the engine. Clearly, the greater the power delivered by the engine, the greater the temperature of the engine under stationary conditions and, hence, the greater the probability of knocking.

Knocking typically is a known cause of serious damages to the components of the engine, especially to the cylinder head and to the piston.

For this reason, ignition timing is normally calibrated on a bench in order to obtain a right balance between the performances that can be obtained by advancing the spark and the prevention of knock phenomena by delaying the ignition.

The calibration takes place under stationary conditions of the engine, if necessary for different conditions of load and speed of the engine.

In this way, the ignition timing can be controlled in a variable manner as a function of the actual load and speed conditions of the engine. The adjustment of the timing is normally assigned to the engine control unit, based on information concerning the load and the speed of the engine, for example obtained by one or more suitable sensors or transducers coupled to the engine.

The approach with variable or adjustable ignition timing discussed above is more advantageous from the point of view of engine performances and efficiency compared to a fixed ignition timing, though it is not free from drawbacks.

In particular, during the normal use on a road or on a track, the engine does not constantly operate under stationary conditions, namely under calibration conditions. On the contrary, the engine often operates in transient, for example during an overtaking.

Under transient conditions, the temperature of engine is much more variable compared to calibration conditions, under which it is relatively high and substantially constant.

Since the temperature of the engine is strongly correlated with knock phenomena, calibrated ignition timing does not always correspond to an actual knock risk. Therefore, the ignition timing is uselessly delayed, with a consequent loss of performances, in numerous specific situations.

For example, in case of an overtaking, the acceleration of the engine increases in a significant manner, but the temperature of the engine increase much more slowly, so that the engine reaches the calibration temperature only once the overtaking is concluded, when the rpm of the engine decreases again. Hence, in this case, the ignition is delayed with no actual knock risk. On the other hand, a spark advance would have improved the performances of the engine, contributing to the success of the overtaking.

Owing to the above, known techniques for the adjustment of the ignition timing need to be improved, so as to overcome, for example, the drawbacks discussed above.

An object of the invention is to fulfil said need.

DESCRIPTION OF THE INVENTION

The object is reached by a process and by an apparatus to adjust the ignition timing as claimed in the independent claims.

The dependent claims define particular embodiments of the invention.

BRIEF DESCRIPTION OF THE DRAWINGS

The invention will now be described hereinafter with reference to the accompanying drawings, which show a non-limiting embodiment thereof, wherein.

EMBODIMENTS OF THE INVENTION

Figure 1:
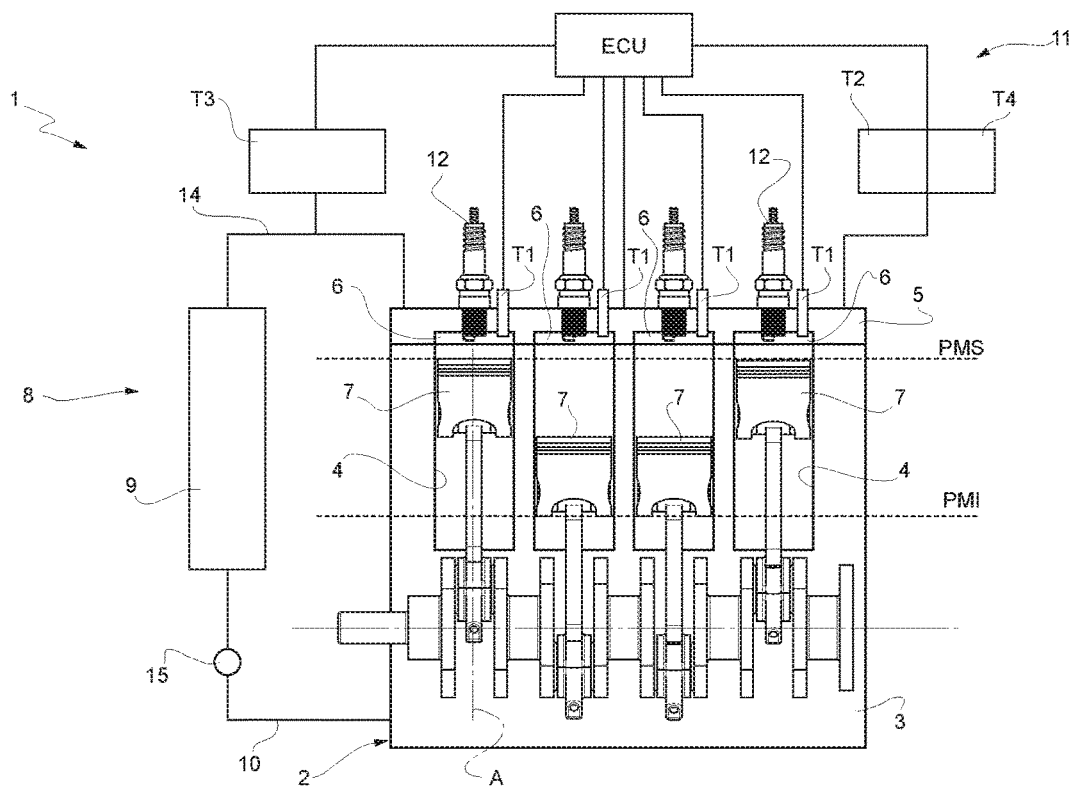
FIG. 1 is a diagram of a vehicle comprising an apparatus to adjust the ignition timing according to the invention.

In FIG. 1, reference number 1 indicates, as a whole, a vehicle comprising an internal combustion engine 2, in particular a spark-ignition internal combustion engine.

The engine 2 comprises a plurality of engine blocks, in particular including a cylinder block 3 defining a plurality of cylinders 4 and a cylinder head 5 arranged so as to cover the cylinders 4. The cylinders 4 define, together with the cylinder head 5, respective combustion chambers 6. Furthermore, inside each cylinder 4, the engine 2 comprises a corresponding piston 7, which can slide along the axis A of the relative cylinder 4 between a bottom dead centre PMI and a top dead centre PMS, which is closer to the cylinder head 5 compared to the bottom dead centre PMI.

The engine blocks have a plurality of inner ducts (not shown herein) for receiving a conditioning fluid, which thermally conditions the temperature of the engine blocks.

In this sense, the vehicle 1 comprises a known conditioning device 8. By way of example, without losing generality, the device 8 includes a heat exchange element 9, for example a radiator, and a conditioning circuit 10. The circuit 10 is configured to cause the fluid to flow from the element 9 to the ducts, so that the fluid flows through the ducts themselves, as well as from the ducts to the element 9, so as to create a closed circuit. Hence, the heat exchanger 9 receives the conditioning fluid, which exchanged heat with the engine blocks, conditions the received fluid and supplies the cooled fluid to the ducts again, where it exchanges heat with the engine blocks.

The device 8 could clearly be configured differently from the example described above, as long as it fulfils its well-known function of recirculating the conditioning fluid through the ducts, so that the engine blocks can thermally be conditioned by the conditioning fluid.

The vehicle 1 further comprises an apparatus 11 to adjust the ignition timing of an air-fuel mixture in the combustion chambers 6, in which the mixture itself is obtained, for example, through direct injection of fuel into the combustion chambers 6. Alternatively, the mixture could be obtained by injecting fuel into the intake ducts (not shown herein). Furthermore, the mixture could also be prepared inside a carburettor, in a traditional manner.

The apparatus 11 comprises a corresponding ignition device 12, for example one or more spark plugs for each one of the combustion chambers 6, specifically a spark plug coupled to the cylinder head 5 inside the corresponding combustion chamber 6.

Furthermore, the apparatus 11 comprises:

transducers T1 configured to detect a first quantity indicative of a pressure of the mixture in the combustion chambers 6, more precisely a maximum or peak pressure, a transducer T2 configured to detect a second quantity indicative of a speed of the engine 2, a transducer T3 to detect a third quantity indicative of a temperature of the conditioning fluid in the engine blocks, namely in a zone of heat exchange between the engine 2 the conditioning fluid, and a control unit ECU coupled to the transducers T1, T2, T3 to get information concerning the detected quantities and coupled to the ignition device 12 to control the ignition of the mixture.

In order to describe the apparatus 11 in its ignition timing adjustment function, the description below discusses one single combustion chamber 6 and the relative spark plug of the ignition device 12. The function of the apparatus 11 for the other combustion chambers 6 is completely similar and independent, so that, as a consequence, it does not require a specific description. Besides, for the purposes of the invention, the presence of several combustion chambers 6 is totally optional. Hence, the ignition device 12 could even consist of one single spark plug.

The control unit ECU stores a heat exchange mathematical model for the combustion chamber 6. The model is designed to map the detected quantities from the first to the third one onto a fourth quantity indicative of a temperature of at least one of the engine blocks delimiting the combustion chamber 6, for example the cylinder block 3 or the cylinder head 5.

Actually, an engine block can also be a wall portion, for example of the cylinder block 3 or of the cylinder head 5, around the combustion chamber 6. Engine block and wall portion can be considered as synonyms. The wall portion or engine block preferably delimits the combustion chamber 6.

Even if the engine blocks do not form one single body, an assembly of engine blocks could anyway be ideally considered as one single body, namely as one single engine block, so that the model, for instance, could consider the assembly consisting of the cylinder block 3 and of the cylinder head 5 as one single body, whose temperature is indicated by the fourth quantity. Moreover, an engine block could be defined by a wall portion of the cylinder block 3 and by an adjacent wall portion of the cylinder head 5, considered as one single body.

Basically, "engine block" defines one or more wall portions, if necessary separated from one another, but anyway considered as one single body, arranged around the combustion chamber 6, for example delimiting the latter. Delimiting means that the wall portion delimits at least part or a partial zone of the combustion chamber 6.

In other words, the control unit ECU stores a model that estimates or traces a temperature of the engine 2, more precisely of one or more wall portions arranged around the combustion chamber 6, for example delimiting the combustion chamber 6. The estimation takes place as a function of three input parameters, namely the peak pressure, the speed of the engine 2 and the temperature of the conditioning fluid in the zone of heat exchange with the engine 2.

More in detail, the quantities from the first to the fourth one could be associated with electric signals provided by the transducers T1, T2, T3 and by the control unit ECU, respectively. For example, the electric signals could be voltage signals.

More generally, the transducer T1 is optional; as a matter of fact, the control unit ECU could determine the first quantity in a different manner, for example by means of a stored model previously identified based on calibration data, namely through the interpolation of stored tables containing the calibration data, or with similar known methods.

Similarly, the transducers T2, T3 are optional, as well. The control unit ECU could determine the second and the third quantity based on empirical or mathematical models, or also based on stored data.

Preferably, the transducer T3 is coupled to the conditioning circuit 10, more preferably in the area of a segment 14 of the path of the conditioning fluid from the ducts of the engine 2 towards the element 9, even more preferably in the area of the engine 2. The transducers T1, T2 are conveniently coupled to the engine 2.

In general, if not through the use of transducers T1, T2, T3, namely through detection, the determination of the quantities from the first to the third one can take place according to any one of many known existing estimation methods, if necessary using deterministic or statistical observers. In any case, whatever the means used to determine the quantities, the control unit ECU would be configured to be coupled to and interact with said means in order to obtain the relevant information to be used in the heat exchange model. The control unit ECU could also comprise each one of said means.

The control unit ECU is programmed to estimate the fourth quantity through the information obtained concerning the quantities from the first to the third one and through the stored model.

Furthermore, the control unit ECU is configured to adjust the ignition timing as a function of the fourth estimated quantity.

Indeed, the fourth quantity reveals the actual temperature of the engine 2 as far as the knock phenomenon is concerned. With this item of information, the control unit ECU can, in general, advance the ignition timing, if the temperature is lower than the calibration temperature, with a smaller risk of knocking.

The heat exchange model can be obtained in different ways, starting from the calibration data. Indeed, the temperature of the engine block can be measured during the calibration of the engine 2, just like the peak pressure, the speed of the engine 2 and the temperature of the conditioning fluid can be measured in a corresponding manner.

Hence, the heat exchange model could be a closed-box model that can be obtained by means of known identification techniques, including techniques which, for example, use neural networks or artificial intelligence.

The heat exchange model preferably is a parametric model. The parameters of the model can be identified by means of a tuning operation based on the calibration data. Even in this case, any known method for the identification of the parameters of the model can be used, including methods which use heuristic algorithms, for example genetic algorithms.

Furthermore, the heat exchange model comprises a modelling of the thermal inertia of the engine block, so that the model is designed to map the three quantities onto the fourth quantity as a function of the modelled thermal inertia.

Figure 2:
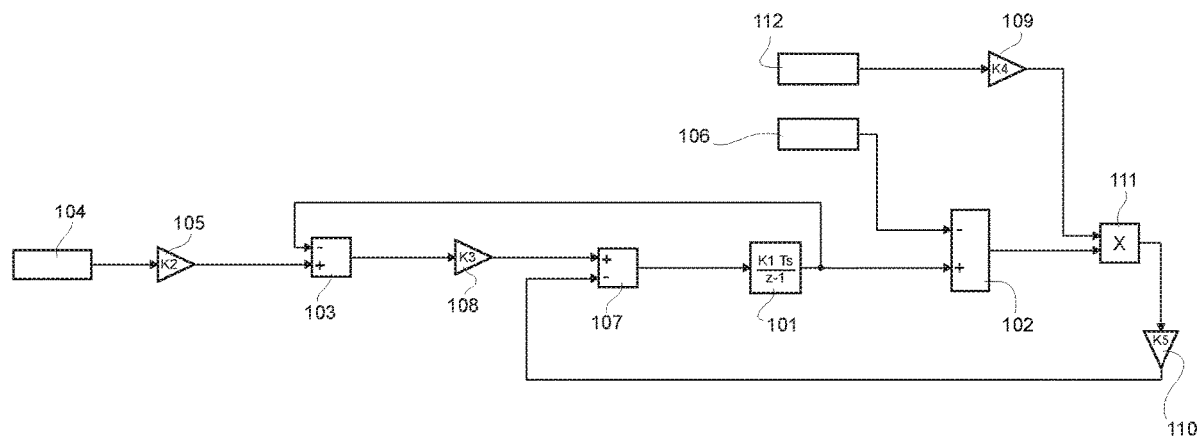
FIG. 2 is a block diagram representing a model used for the adjustment of the ignition timing.

More in detail, an example of the heat exchange model is shown in FIG. 2.

In the example of FIG. 2, block 101 represents a discrete numerical integrator, in particular according to a forward Euler method (symbol 1/z−1 to identify the Z-transform in question), namely, more in general, according to an explicit integration method. Block 101 corresponds to the execution of the integral of a heat flow flowing through the engine block. Therefore, the model maps the three quantities onto the fourth quantity by means of a numerical integration of the heat flow.

In the example of FIG. 2, block 101 comprises a parameter Ts, which represents a discrete time sample and which is used as multiplying factor. Furthermore, block 101 comprises a parameter K1, which represents an integration gain. The gain K1 dimensionally turns the heat flow into a temperature; furthermore, the gain K1 preferably takes into account, namely is a function of, the thermal inertia of the engine block.

In the initial instant, the output of block 101 is the initial temperature condition of the engine block, for example the ambient temperature that can be measured on board the vehicle 1, whereas, in the following instants, the output is the result of the integration representing the actual temperature of the engine block.

In the example of FIG. 2, the temperature of the engine block outputted by block 101 is used to calculate a first and a second temperature difference (difference blocks 102, 103).

In particular, the first temperature difference is between the temperature of the engine block and a temperature corresponding to the peak pressure. In FIG. 2, this last temperature is obtained by applying, to the peak pressure (input block 104, indicated by the first quantity), a gain K2 (block 105). Actually, the gain K2 represents a function of the peak pressure. As a matter of fact, the temperature outputted by block 105 can be obtained as a function of the first quantity, indicative of the peak pressure, by means of a theoretical calculation, for example based on the first law of thermodynamics and/or on the modelling of basilar thermodynamic transformations (e.g. polytropic transformation, isenthalpic transformation, etc.). Alternatively, the temperature of block 105 can be obtained by means of a model stored by the control unit ECU, for example based on experimental or calibration data. Similarly, the use of tables stored in the control unit ECU is also possible.

The second temperature difference preferably is between the temperature of the engine block and the temperature of the conditioning fluid (input block 106, indicated by the third quantity).

The first and the second temperature differences are used to calculate respective heat flows flowing through the engine block and whose algebraic sum or effect overlap (difference block 107) results into the heat flow, which is then integrated in the model to obtain the temperature of the engine block.

In other words, the heat flow is modelled as flow resulting from the presence of a first and a second heat flow.

The first heat flow can be modelled as a product between the first temperature difference and a first heat exchange coefficient K3 (block 108).

The heat exchange coefficient K3 can be a single constant value stored in the control unit ECU, as well as a function modelled in the control unit ECU. The modelling of a heat exchange, specifically through conduction and convection, by means of a heat exchange coefficient, is known in engineering physics, so that it does not require a detailed description.

The second heat flow can be modelled similarly to the first one, namely as a product between the second temperature difference and a second heat exchange coefficient.

In this case, the second heat exchange coefficient preferably comprises two factors K4 and K5, modelled as multiplying gains (blocks 109, 110) to be multiplied by the second difference (multiplication block 111).

The gain K4 is applied to the speed of the engine 2 (input block 112, indicated by the second quantity).

The gain K5 is a final gain, which permits a further degree of freedom for the synchronization of the model. The addition of the gain K5 allows non-linear behaviours to be modelled.

Therefore, the second heat exchange coefficient is modelled as a function of the speed of the engine 2, so as to be increasing with the speed of the engine 2. In particular, the second heat exchange coefficient is proportional to the speed of the engine 2.

The increase of the second heat exchange coefficient with the speed of the engine 2 corresponds to the fact that the conditioning fluid flow rate notoriously increases with the speed of the engine 2, in particular in a proportional manner. As a matter of fact, the conditioning circuit 10 normally comprises a pump 15 (FIG. 1), whose speed is proportional to the one of the engine 2, so as to pump the conditioning fluid from the element 9 towards the ducts. As it is known, the conditioning fluid flow rate, in turn, is proportional to the speed of the pump.

The increase of the conditioning fluid flow rate corresponds to an increase of the flow of heat exchanged between the conditioning fluid and the engine block through convection. The second heat exchange coefficient, specifically the gain K4 applied to the speed of the engine 2, takes into account this fact.

As far as the modelling of the heat exchanges is concerned, the same considerations made for the first heat flow also apply to the second heat flow, in particular to the gain K4. The gain K5 is additional to model non-linear behaviours.

The model of FIG. 2 comprises a plurality of gains K1, K2, K3, K4, K5. They could be constant or functions of parameters. In any case, the gains K1, K2, K3, K4, K5 can be obtained by means of tuning relative to the calibration data, including measures of the temperature of the engine block, of the peak pressure, of the speed of the engine 2 and of the temperature of the conditioning fluid. The tuning can be carried out, for example, by means of known optimization algorithms.

In order to adjust the ignition timing based on the stored model, the control unit ECU is further programmed to determine the temperature of the engine block through the fourth estimated quantity. Furthermore, the control unit ECU is programmed to determine a fifth quantity indicative of a relationship between the temperature of the engine block and a reference or calibration temperature for the engine block. The control unit ECU is configured to adjust the ignition timing as a function of the fifth quantity.

In particular, the fifth quantity is a difference between the temperature of the engine block and the reference temperature. The greater the difference, the greater the advance with which the control unit ECU operates the ignition of the mixture through the ignition device 12. In other words, the more the fifth quantity indicates that the temperature of the engine block is smaller than there reference temperature, the more the control unit ECU is programmed to advance the ignition.

The control unit ECU preferably stores the reference temperature as a function of the second quantity, indicative of the speed of the engine 2, and of a sixth quantity, indicative of a load to which the engine 2 is subjected.

As a matter of fact, the ignition timing of the engine 2 is normally calibrated on the bench for a plurality of speed and load values of the engine 2. Therefore, each pair of load and speed values of the engine 2, during the calibration, can be associated with a reference temperature of the engine 2 under stationary conditions. This association produces a map, in particular in a table format.

The control unit ECU stores the mapping of the reference temperature, the second quantity and the sixth quantity. For example, the control unit ECU stores the mapping or table, specifically.

Furthermore, the apparatus 11 comprises a transducer T4 configured to detect the sixth quantity. In particular, the transducer T4 is coupled to the engine 2. The control unit ECU is designed to be coupled to the transducer T4 in order to get information on the sixth quantity detected by the transducer T4. The considerations made for the quantities from the first to the third one also apply to the sixth quantity; namely, the sixth quantity can be determined by the control unit ECU in ways other than the detection by means of the transducer T4.

The control unit ECU determines the reference temperature, namely the temperature that the engine block would have had under stationary conditions, as a function of the second and of the sixth quantity. Then, the control unit ECU determines the fifth quantity as a function of the reference temperature. Hence, the control unit ECU adjusts the ignition timing as a function of the fifth determined quantity.

More precisely, the control unit ECU adjusts the ignition timing as a function of the difference between the actual temperature of the engine block and the reference temperature, namely the temperature that the engine block would have had under stationary conditions.

In particular, the adjustment of the ignition timing can also take place as a function of the second and of the sixth quantity.

To this aim, the control unit ECU stores a mapping designed to map the set of quantities consisting of the second, the fifth quantity and the sixth quantity onto a timing value for the ignition timing.

The control unit ECU calculates the timing value by means of the stored mapping based on the relevant set of quantities. By so doing, the adjustment of the ignition timing takes place by means of the control unit, which controls the ignition device 12 in accordance with the calculated timing value. If the temperature of the engine block is lower than the reference temperature, the calculated timing value leads to an advance of the ignition timing relative to the timing value according to the calibration of the engine 2 under stationary conditions.

In other words, the calculated timing value is applied for the ignition timing during the transient of the engine 2.

The mapping for the calculation of the timing value is advantageously calibrated relative to experimental or calibration data of the engine 2 in transient state.

During the calibration in transient state, each set of three values consisting of difference between engine block temperature and reference temperature (fifth quantity), speed of the engine 2 (second quantity) and load of the engine 2 (sixth quantity) is associated with an advance or delay value of the ignition timing.

This last value is experimentally calibrated assessing the occurrence of knock phenomena. Basically, for each condition defined by the aforesaid set of three values, the advance of the ignition timing is increased until knocking occurs.

It is even possible to choose an acceptable knocking level or to choose to completely avoid knocking, as deemed preferable. In any case, the timing value is chosen in an aware and programmed manner with respect to the actual possibility of occurrence of knocking and to the relative significance of the extent of the occurring knocking.

In other words, the timing value, which can be determined by means of the stored mapping, corresponds to a maximum spark advance admissible under the conditions of speed and load of the engine 2 indicated by the second and the sixth quantity, without a level or an extent of the occurring knocking exceeding a predetermined limit.

For example, the predetermined limit is zero. In other words, the occurrence of knock phenomena could not be tolerated.

Alternatively, the mapping could also take into account either the second or the sixth quantity, together with the fifth quantity for the assessment of the timing value. If the sixth quantity is not taken into account, it can avoid being determined.

Similarly, the fifth quantity could be a function of either the second or the sixth quantity. If the sixth quantity is not taken into account, it can avoid being determined.

The operation of the apparatus 11 corresponds to the process to adjust the ignition timing of the mixture in the combustion chamber 6 of the engine 2.

The process comprises the steps of
determining the first quantity,
determining the second quantity,
determining the third quantity, providing the heat exchange mathematical model for the combustion chamber, estimating the fourth quantity by means of the three determined quantities and by means of the mathematical model, and adjusting the ignition timing as a function of the fourth estimated quantity.

The process described above can be carried out by the apparatus 11 through the instructions of a computer program. The program can even be uploaded onto means that can be read by the computer.

Owing to the above, the advantages of the process and of the apparatus 11 according to the invention are evident.

Thanks to the invention, the performances and the efficiency of the engine 2 can be increased through the sole adjustment of the ignition timing, without risking knock phenomena. This overcomes the technical bias according to which the ignition timing cannot be advanced relative to the calibration conditions.

The use of the heat exchange mathematical model is reliable and allows the process of the invention to be carried out without having to introduce sensors to measure the temperature of the engine block. In particular, the model stored in the control unit ECU also admits the possibility that the conditioning fluid heats the engine block, rather than cooling it.

Taking into account the thermal inertia of the engine block is advantageous since it permits a more realistic assessment of knock risks.

The reliability of the heat exchange model and of the advancing adjustment of the timing are ensured by calibration operations to which the engine 2 is subjected.

Finally, the process and the apparatus 11 according to the invention can be subjected to changes and variants, which, though, do not go beyond the scope of protection set forth in the appended claims.

For the sake of clarity, it should be pointed out that terms such as first, second, third, fourth, fifth and sixth quantity could be interchangeable with the quantities indicated by them.

The invention claimed is:

1. A process to adjust the ignition timing of an air-fuel mixture in a combustion chamber (6) of an internal combustion engine (2), the process comprising the steps of
   a. determining a first quantity indicative of a pressure of the mixture for a cycle of the engine,
   b. determining a second quantity indicative of a speed of the engine (2),
   c. determining a third quantity indicative of a first temperature of a conditioning fluid used to thermally condition the combustion chamber (6) at a zone of heat exchange between the engine (2) and the conditioning fluid,
   d. providing a heat exchange mathematical model for the combustion chamber (6), the model mapping the set of three quantities, consisting of the first, the second and the third quantity, onto a fourth quantity indicative of a second temperature of a wall portion (3, 5) of the engine (2) around the combustion chamber (6),
   e. estimating the fourth quantity by means of the three determined quantities and by means of the mathematical model, and
   f. adjusting the ignition timing as a function of the fourth estimated quantity.

2. The process according to claim 1, wherein the mathematical model maps said three quantities onto the fourth quantity as a function of a thermal inertia of the wall portion (3, 5).

3. The process according to claim 1, wherein the mathematical model maps said three quantities onto the fourth quantity by means of a numerical integration of a heat flow flowing through the wall portion (3, 5).

4. The process according to claim 3, wherein the heat flow is modelled as a flow resulting from the presence of a first and a second heat flow modelled as respective products of a first and a second heat exchange coefficient, with a first and a second temperature difference respectively, wherein
   the first temperature difference is between the second temperature and a third temperature of the mixture corresponding to said pressure; and
   the second temperature difference is between the first temperature and the second temperature.

5. The process according to claim 4, wherein the second heat exchange coefficient is modelled depending on the speed of the engine (2), so as to be increasing with the speed of the engine (2).

6. The process according to claim 1, wherein step f comprises the steps of
   f1. determining the second temperature by means of the fourth quantity,
   f2. determining a fifth quantity indicative of a relationship between the second temperature and a fifth reference or calibration temperature for the wall portion (3, 5), and
   f3. adjusting the ignition timing depending on the fifth quantity.

7. The process according to claim 6, wherein step f3 comprises a greater spark advance the more the fifth quantity indicates that the second temperature is smaller than the fifth temperature.

8. The process according to claim 6 and further comprising the step of
   g. determining a sixth quantity indicative of a load of the engine (2),
   wherein the fifth temperature is a function of the second and sixth quantity.

9. The process according to claim 8, further comprising the steps of
   h. providing a mapping that maps the further set of quantities, consisting of the second quantity, the fifth quantity and the sixth quantity, onto a timing value for the ignition timing,
   i. calculating said value by means of the mapping based on the further set of quantities,
   wherein step f3 comprises the application of said value for the ignition timing.

10. The process according to claim 9, wherein said value corresponds to a maximum spark advance admissible under conditions of speed and load of the engine (2) indicated by the second and sixth quantity, without a knock level exceeding a predetermined limit.

11. An apparatus (11) to adjust the ignition timing of an air-fuel mixture in a combustion chamber (6) of an internal combustion engine (2), the apparatus comprising
   first determining means (T1) to determine a first quantity indicative of a pressure of the mixture for a cycle of the engine,
   second determining means (T2) to determine a second quantity indicative of a speed of the engine,
   third determining means (T3) to determine a third quantity indicative of a first temperature of a conditioning fluid used to thermally condition the combustion chamber (6), at a zone of heat exchange between the engine (2) and the conditioning fluid, ignition means (12) connectable to the engine (2) to ignite the mixture in the combustion chamber (6), a control unit (ECU) adapted to be coupled to each one of said first, second and third determining means (T1, T2, T3) so as to extract corresponding information concerning the first, second and third determined quantity as well as adapted to be coupled to said ignition means (12) so as to control the ignition of the mixture, wherein the control unit (ECU) stores a heat exchange mathematical model for the combustion chamber (6), the model mapping the set of three quantities, consisting of the first, the second and the third quantity, onto a fourth quantity indicative of a second temperature of a wall portion (3, 5) around the combustion chamber (6), wherein the control unit (ECU) is programmed to estimate the fourth quantity by means of said extracted information and by means of the mathematical model as well as to adjust the ignition timing by controlling the ignition means (12) as a function of the fourth estimated quantity.

12. The apparatus according to claim 11, wherein the control unit (ECU) stores a fifth reference or calibration temperature for the wall portion (3, 5) and is further programmed to determine the second temperature by means of the fourth quantity, determine a fifth quantity indicative of a relationship between the second temperature and the fifth temperature, and adjust the ignition timing as a function of the fifth quantity.

13. The apparatus according to claim 12, further comprising fourth determining means (T4) to determine a sixth quantity indicative of a load of the engine (2), wherein the control unit (ECU) stores the fifth temperature as a function of the second and sixth quantity.

14. The apparatus according to claim 13, wherein the control unit further stores a mapping that maps the further set of quantities, consisting of the second quantity, the fifth quantity and the sixth quantity, onto a timing value for the ignition timing, the control unit (ECU) being further programmed to calculate said value by means of the mapping based on the further set of quantities and to apply said value by means of the ignition means (12) when adjusting the ignition timing.

15. A computer program comprising instructions that allow the apparatus of claim 11 to carry out the steps of the process of claim 1.

* * * * *